(No Model.) 7 Sheets—Sheet 1.

T. T. HEATH & A. N. VERDIN.
TYPE WRITING MACHINE.

No. 553,909. Patented Feb. 4, 1896.

Fig. 1.

Witnesses:
M. S. Belden.
P. P. Sheehan.

Inventors
Thomas T. Heath
Alvin N. Verdin
by James W. See
Attorney

Fig. 2.

(No Model.)  7 Sheets—Sheet 5.

T. T. HEATH & A. N. VERDIN.
TYPE WRITING MACHINE.

No. 553,909. Patented Feb. 4, 1896.

Witnesses:
M. S. Belden
P. P. Sheehan

Thomas T. Heath
Alvin N. Verdin
Inventors
by James W. See
Attorney (No Model.) 7 Sheets—Sheet 6.

T. T. HEATH & A. N. VERDIN.
TYPE WRITING MACHINE.

No. 553,909. Patented Feb. 4, 1896.

Witnesses:
M. S. Belden
P. P. Sheehan

Inventor
Thomas T. Heath
Alois N. Verdin
by James N. See
Attorney (No Model.) 7 Sheets—Sheet 7.

T. T. HEATH & A. N. VERDIN.
TYPE WRITING MACHINE.

No. 553,909. Patented Feb. 4, 1896.

Witnesses:
M. S. Belden
P. P. Sheehan

Thomas T. Heath
Alois N. Verdin
Inventors by James W. See
Attorney

ANDREW B.GRAHAM. PHOTO-LITHO. WASHINGTON.D.C.

UNITED STATES PATENT OFFICE.

THOMAS T. HEATH, OF LOVELAND, AND ALOIS N. VERDIN, OF GLENDALE, OHIO; SAID VERDIN ASSIGNOR TO SAID HEATH.

TYPE-WRITING MACHINE.

SPECIFICATION forming part of Letters Patent No. 553,909, dated February 4, 1896.

Application filed September 15, 1892. Renewed August 19, 1895. Serial No. 559,801. (No model.)

*To all whom it may concern:*

Be it known that we, THOMAS T. HEATH, of Loveland, Clermont county, and ALOIS N. VERDIN, of Glendale, Hamilton county, Ohio, have invented certain new and useful Improvements in Type-Writing Machines, of which the following is a specification.

Our improved type-writing machine, aside from improvements in details of construction, provides for the production of justified copy, and also provides for instant changing in the color of the printing.

Assume that a certain length of line is chosen for the present work of a type-writing machine, and assume that near the end of that line it is discovered that the line is not filled and that there is no room for an additional word or syllable, this gives us a short line. In this line there will of course have been a certain number of spaces between words and those spaces will have been of uniform measure. If we knew the number of the spaces and had it in our power to change the measure of the several spaces, we could widen those spaces so as to fill the line, or, possibly, we could narrow some or all of the spaces so as to permit an additional word or syllable. In our improved machine we arrange for a record of the number of spaces in a line of work and we arrange for spaces of various measures. Finding, on the completion of the short line, that a certain number of spaces of standard measure have been employed, and knowing the measure of incompletion of the line, we may at once determine the quantity of surplus line length to be distributed among the spaces, either evenly or irregularly. At the end of such line we may write with the machine the data thus obtained, and if such copy be rewritten, with regard to such data, the spacing may be such as to make all lines complete, or, in other words, produce justified copy; or the original copy with its data is in condition for use by operators of type-setting and matrix-making machines. Thus far we may have assumed that all the letters are given equal space, as is quite customary in ordinary type-writing machines; but in our improved machine we recognize the varying width of letters and arrange that the paper shall feed an appropriate distance for each letter. Choosing a unit of space we find that certain characters require that space and that all other characters require either that space or some multiple of it, and that seven degrees of spacing or feeding will answer for all of the work of ordinary printing-characters. For normal spaces between words a certain number of this unit of feed is employed, and justification is effected by increasing or decreasing the number of units for some or all of the spaces.

We provide our machine with two ribbons —say one black and one red—either being brought instantly into use, thus permitting writing to be produced with its main portions in one color and exceptional portions in another color.

Our improvements will be readily understood from the following description and accompanying drawings of a type-writing machine exemplifying our invention, in which—

In the drawings, (referring for the present as far as practicable to Fig. 1,) 1 indicates general fixed frame parts; 2, the pivot-ring for the type-bars, supported horizontally in the upper portion of the frame and consisting, substantially, of an annular disk whose rim projects somewhat outwardly beyond its upper portion; 3, radial slots cut through the lower portion of this ring, one slot for each type-bar, the width of the slots being such as to fairly fit and guide the type-bars, the slots extending across the ring horizontally so as to cut entirely through the outer rim of the ring; 4, an inner annular lip projecting downwardly from the pivot-ring, the slots extending also through this lip. The lower portion of the outer circumference of pivot-ring 2 is of greater diameter than the upper portion, and the radial slots therein are cut through said enlarged lower portion.

Figures 12, 13:
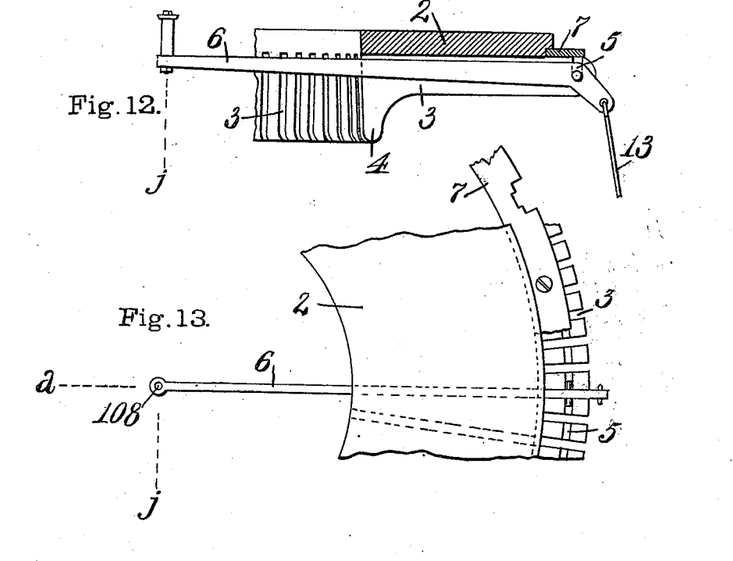
Fig. 12, a vertical section of a portion of the type-bar pivot-ring in the plane of line $a$.
Fig. 13, a p'an of the same.

5, Figs. 12 and 13, is an annular groove cut down into the top of the rim of the ring to about half the depth of the radial slots; 6, the type-bars, one for each letter of the machine, hung in the slots and provided with trunnions resting in the groove 5, and 7 a keeper-ring mounted upon the rim of the pivot-ring and closing the top of groove 5. The types of the type-bars thus strike to a common center. The groove furnishes the trunnion-bearings for all of the type-bars. The keeper-ring prevents the displacement of the bars, and the keeper-ring has a notch which will permit the upward removal of any type-bar over which the notch may be brought by turning the ring. The trunnions of neighboring type-bars make endwise contact with each other and thus center the type-bars in the radial slots in which they fit freely at the heels of the type-bars. As a type-bar rises to striking position the extent of its bearing in its radial slot increases and, when the bar has reached the striking position, it becomes guided by its slot at a point far distant inwardly from its pivot. This construction secures accuracy of striking even when very long type-bars are employed, thus permitting the use of a very large number of type-bars. Lip 4 maintains a guide for the dropping type-bar to the point where interference between two type-bars would be liable to occur, thus causing the interference, should there be any, to act on the type-bars in such manner as to swing them on their pivots instead of bending them sidewise.

Figure 1:
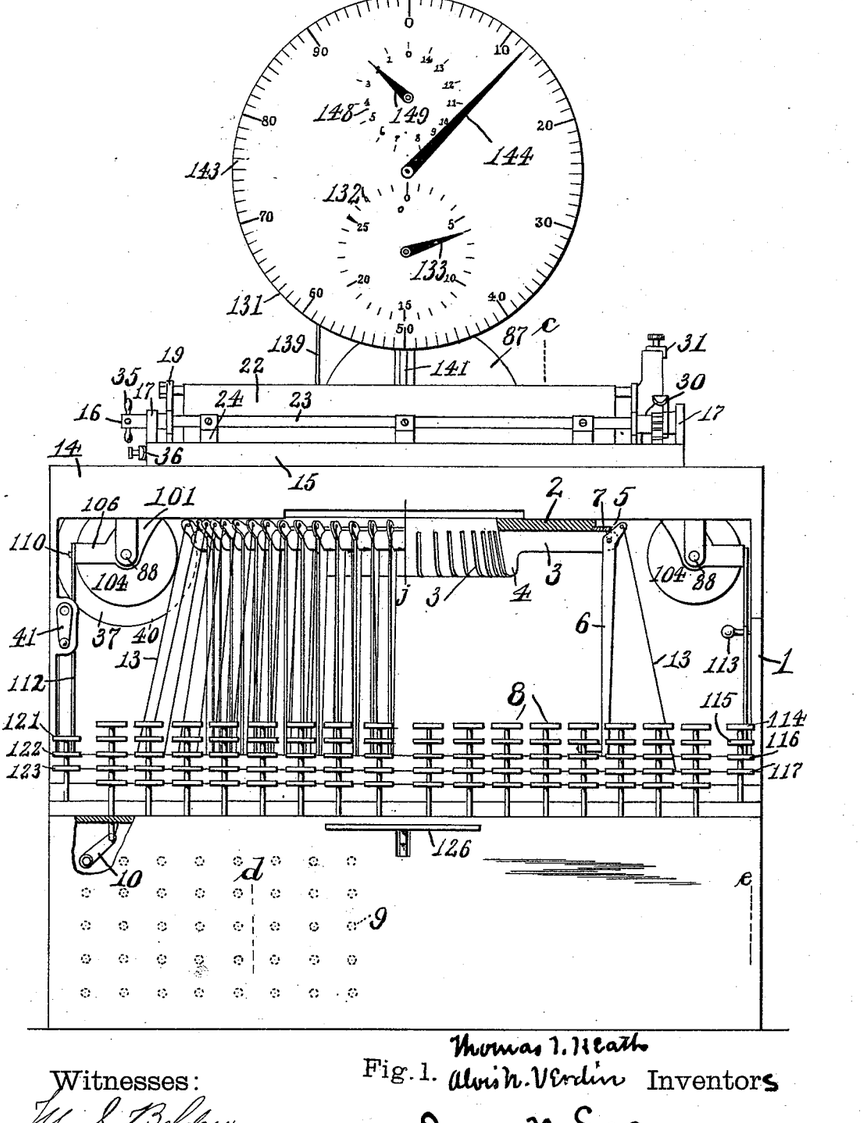
Figure 1 is a front elevation of the machine, portions appearing in vertical section in the planes of lines $a$ and $b$ of other figures.
Figure 8:
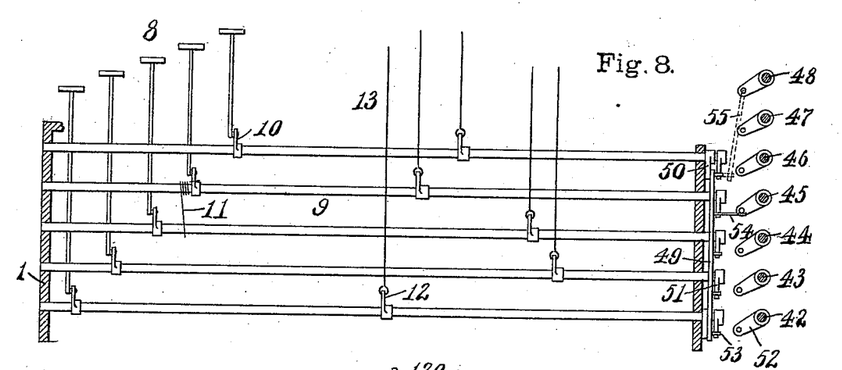
Fig. 8, a side elevation of one of the vertical rows of type-shafts, the frame and back shafts appearing in section in the plane of line $d$ of other figures, the direction of view being the same as in Fig. 3.

Proceeding with other parts, 8, Fig. 1, indicates a number of finger-keys, one for each type-bar of the machine, these keys being arranged in longitudinal and transverse rows; 9, Fig. 8, a series of shafts, one for each type-bar, disposed fore and aft across the base of the machine and journaled in the frame, these shafts being arranged in vertical rows corresponding with transverse rows of finger-keys 8; 10, an arm fast on each shaft at the foot of its appropriate finger-key, the stem of the key being pivoted to the arm so that downward pressure on a key will rock the appropriate shaft; 11, a coiled spring upon each shaft, at the arms 10, and engaging the arm and engaging also a neighboring shaft, such spring tending to hold the shaft in normal position, a spring of this character being applied to all of the shafts of the machine which require to be returned to normal position after rocking; 12, similar arms secured to the shafts below the pivot-ring 2, and 13 links connecting arms 12 with the heels of the type-bars. Arms 12 are placed at various points along shafts 9 in position best suited for connection of their various links 13 with the type-bars. Upon the depression of a given key its appropriate shaft will be rocked and the appropriate type-bar will be thrown up and, upon removing the finger from the key, the type-bar will fall again to normal position, spring 11 rendering any necessary aid.

Proceeding further, and referring to Figs. 1, 3, 6, and 14, 14 indicates a carriage-guide formed across the top of the machine in the frame; 15, a rectangular carriage-frame fitted for free sliding motion in this guide; 16, a shaft extending the length of the carriage and journaled in the ends thereof; 17, the end portions of the carriage in which this shaft is journaled; 18, a spring at one of the end journals of this shaft, serving to make frictional resistance to the turning of the shaft and serving also to take up all endwise lost motion of the shaft; 19, a pair of three-armed spiders loose on shaft 16, one at each end of the carriage; 20, a bar rigidly joining the two spiders and extending lengthwise between them and presenting its base over the axis of pivot-ring 2, this bar forming the anvil to resist the stroke of the type; 21, a strip of rubber or analogous material disposed along in the lower face of bar 20 to form an elastic surface for the types; 22, a flexible metal fender extending between the spiders 19 and having its upper edge rigidly connected with them and extending downwardly in a curve concentric to shaft 16 and having its lower edge even with the lower surface of bar 20; 23, a shaft supported by the front arms of the spiders; 24, narrow clips pivoted on shaft 23 and extending downwardly in a curve concentric to shaft 16, their lower ends coming up against the front portion of the lower face of bar 20, these clips being secured upon shaft 23 so as to be capable of being turned so as to bring the points of the clips to or from bar 20 and so as to be capable of endwise adjustment along the bar; 25, a feed-roll, preferably of rubber, journaled in the spiders behind bar 20 and with the lower portion of its periphery in contact with fender 22 near rubber strip 21; 26, a pinion on the right-hand end of the shaft of this roll; 27, a pinion fast on shaft 16, in the plane of pinion 26; 28, an intermediate gear engaging these two pinions and mounted on the right-hand one of spiders 19; 29, a ratchet-wheel fast with pinion 27; 30, a finger-lever pivoted loosely on shaft 16 alongside the ratchet-wheel; 31, an adjustable stop on a segment carried by the right-hand spider 19 and serving to limit the rocking motion of lever 30; 32, a pawl carried by the finger-lever and adapted to engage the ratchet-wheel; 33, a stop-pawl provided with a handle and mounted on the right-hand spider 19 and engaging the ratchet-wheel and preventing its retrograde motion under the drag of pawl 32; 34, a heel-stop carried by the spider and adapted to engage the heel of pawl 32 when the pawl is in normal position and hold the pawl out of engagement with the ratchet-wheel; 35, a handle on shaft 16, and 36 a spring-detent supported by the carriage and engaging the left-hand one of spiders 19 and holding the spider structure in normal position with the strip 21 down.

Figure 14:
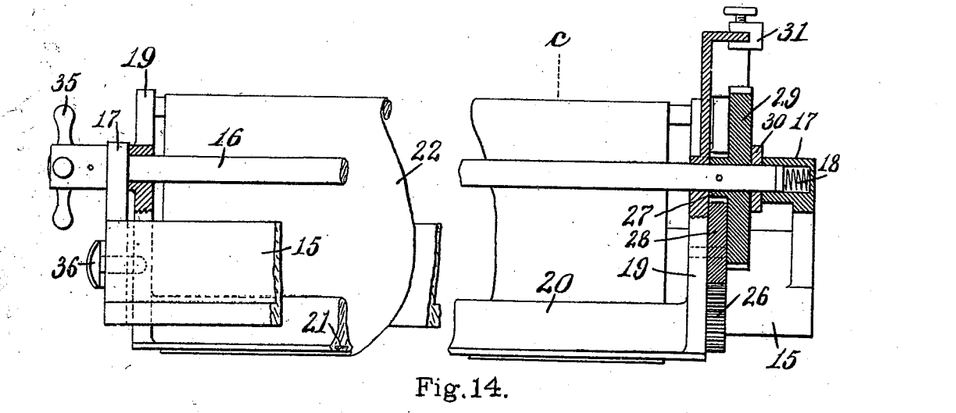
Fig. 14, a front elevation, part vertical longitudinal section, of the carriage and paper-holder, the section being taken in the plane of line $a$ of other figures.

The spider structure is seen to be capable of rocking on shaft 16 and held in normal position by detent 36. The lower edge of the paper is to be started against the inner upper surface of fender 22 and passed downwardly till it engages the feed-roll. Then the feed-roll may be turned by turning handle 35, thus feeding the paper in under strip 21 and up along the inner surface of clips 24, after which the clips may be pressed home, holding the paper neatly against the lower surface of bar 20. The clips may be adjusted along the carriage to suit the width of paper in use. When the line is completed, the paper is advanced by raising finger-lever 30, the position of stop 31 determining the degree of advance of the paper, such stop being adjusted to correspond with one or more teeth of the ratchet-wheel, as desired. The paper may be fed backward by releasing stop-pawl 33, heel-pawl 34 holding pawl 32 normally disengaged from the ratchet. By releasing detent 36 the entire paper-holding structure may be rocked upon shaft 16, thus swinging strip 21 up to the front and exposing the line of writing to inspection.

As to feeding the carriage forward after each letter, referring to Figs. 1, 2, 3, and 16, 37 indicates a spring-barrel mounted loosely on a horizontal shaft 88 at one end of the carriage-guide; 38, a cord or equivalent flexible medium attached to the carriage and wound upon the spring-barrel; 39, a spring coiled within the spring-barrel like a clock-spring and attached to the barrel and to a sleeve on which the barrel loosely turns; 40, a gear fast with this sleeve, and 41 a shaft geared to this gear and provided with a detent-handle.

The strain of the spring is such as to wind up the cord and draw the carriage to the right of the machine, (the right of the machine being the left in Fig. 1.) If uncontrolled the spring would draw the carriage fully to the right and hold it there. Feed-measuring mechanism is provided for controlling the movement and permitting the spring to draw the carriage a definite distance after each letter has been struck, as will be later described. The tension of the spring may be regulated by turning shaft 41, thus winding up the spring to a greater or less extent.

Figure 11:
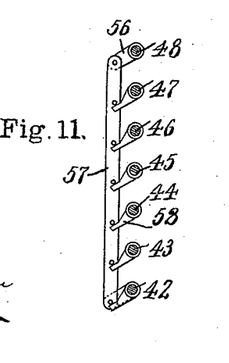
Fig. 11, a vertical section of the group of back shafts, taken in the plane of line $f$ of other figures.

As to measuring the feed of the carriage, 42 indicates a shaft disposed across the rear of the machine, this shaft rocking under the influence of such finger-keys as operate type calling for one unit of feed, this shaft being hereinafter spoken of as the "one-degree" shaft; 43, 44, 45, 46, 47, and 48, other shafts disposed in series along over shaft 42 and similarly pertaining, respectively, to two, three, four, five, six, and seven degrees of feed-motion for the carriage, all these back shafts being in a vertical row beyond the rear ends of shafts 9, which swing the type-bars; 49, Figs. 2 and 8, a link-bar extending down parallel with a row of the shafts 9, there being one of these link-bars for each of the rows of type-shafts; 50, a link at each end of this link-bar, pivoted to the link-bar and at the top and bottom ones of the row of type-shafts, so that the link-bar 49 may rise and fall parallel with its row of type-shafts; 51, an arm fast on the rear end of each type-shaft and projecting across the face of link-bar 49; 52, an arm fast on some one of the back shafts at some one of the link-bars 49, and projecting inwardly toward the link-bar, this arm 52 having a pin projecting, parallel with its back shaft, across in front of its link-bar; 53, a series of studs projecting from the face of the link-bar, one over each of the arms 51, so that if any type-shaft be rocked its arm 51 will lift the link-bar 49; 54, one of the studs 53 prolonged outwardly so as to come under the pin of arm 52 pertinent to that link-bar; 55, a link to be employed as a substitute for long pin 54 in cases where a given link-bar 49 is to be connected with a back shaft higher than the link-bars, as is the case with back shafts 47 and 48; 56, Figs. 2 and 11, an arm fast on the seven-degree back shaft 48; 57, a link-bar carried by this arm and passing down along the entire group of back shafts, and having its lower end carried by an arm loose on the lowest back shaft, similar to link-bar 49, and similarly provided with studs projecting from its face; 58, an arm fast on each of the back shafts, except the top one, these arms engaging under the pins of link-bar 57, so that the rocking of any back shaft lifts link-bar 57 and rocks the seven-degree back shaft 48, and 59 a spring provided upon each back shaft to hold it in normal position, the same as in the case of the type-shafts.

Of the various letters or characters some will require one degree of feed, others two degrees, &c., the greatest requirement being seven degrees. The back shafts serve, as hereinafter explained, in determining the number of degrees of feed motion permitted to the carriage of the machine, and it is therefore necessary that as a type-bar is operated an appropriate one of the back shafts shall be rocked. The back shafts are to be so apportioned and connected with the type-shafts 9 that the types operated by the shafts of a vertical row of type-shafts shall require the same number of degrees of feed. Several different rows may require the same number of degrees of feed or otherwise, but a single row must be limited to one feed requirement. Such distribution having been effected, and the measure of modern types readily permits of it, each vertical row of type-shafts will be arranged to give rocking motion to that one of the back shafts pertinent to its feed requirement. Thus in Fig. 2 the casing has been broken away to expose a vertical row of type-shafts. The turning of any one of these shafts lifts the link-bar pertaining to that row, and the long stud 54 of that link-bar engages under an arm 52, which is fast on back shaft 45, and this back shaft pertains to four degrees of feed motion. Therefore, the type-shafts of this vertical row must be connected with type-bars requiring four degrees of feed motion. In a similar manner the link-bar of a given vertical row of type-bars may give motion to any particular one of the back shafts by properly disposing the arms 52 of the back shafts so as to come at the link-bars 49 of the proper type-shaft rows, the connections between the link-bars and the arms 52 being made by the long studs 54 in the case of all the back shafts but the upper two, in which case the connections are made by links 55. It is therefore to be understood that when any finger-key 8 is depressed it causes a type to strike and it also rocks a back shaft pertinent to the number of degrees of feed required by that type. Attention is at this point directed to the fact that while the back shafts are thus moved independently the upper one of the back shafts, 48, is always moved by link-bar 57. This top shaft 48 is the seven-degree shaft, but will not necessarily impose a seven-degree feed upon the carriage of the machine, for the operation of any lower-value shaft will interpose a shorter limit to the feed, as will be later explained. The top shaft 48 is employed also for operating the ribbon mechanism and also for operating a part of the feed mechanism common to all the degrees of feed. Hence this top shaft is arranged to move at each impulse of the machine.

Figure 2:
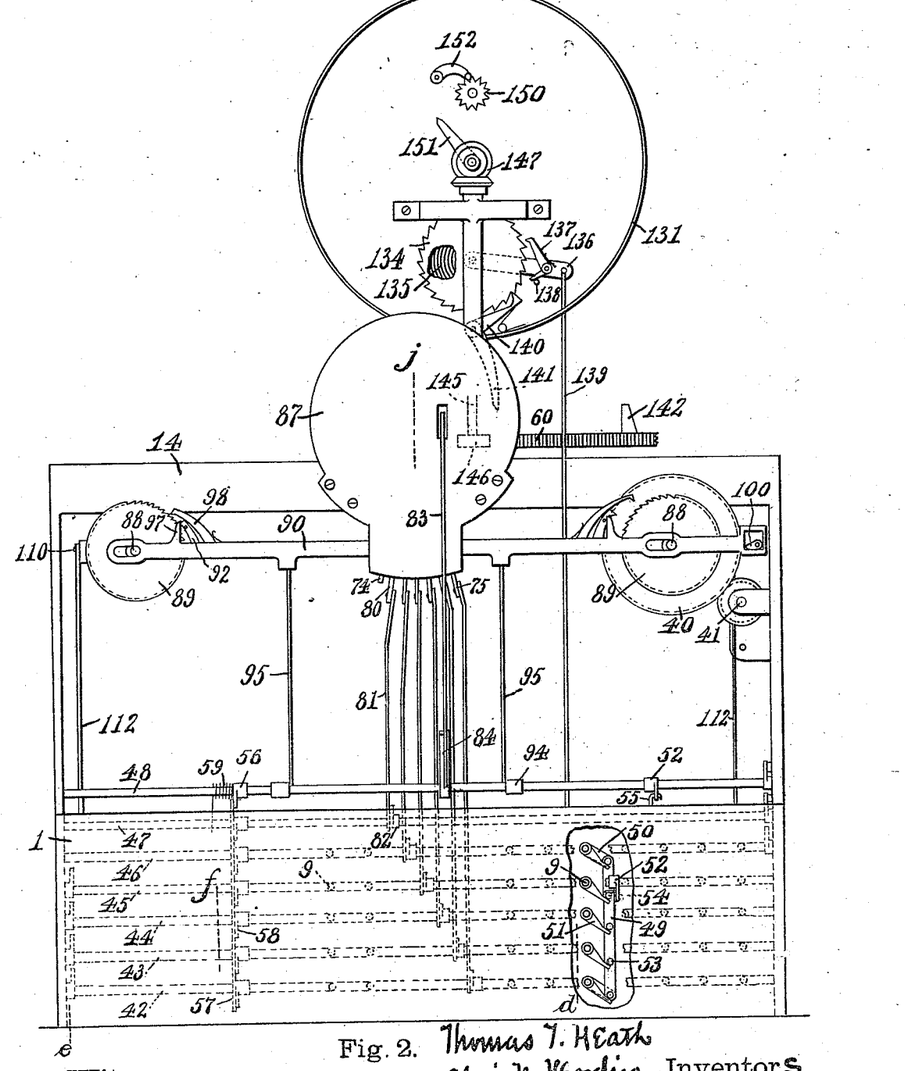
Fig. 2, a rear elevation of the same, the carriage being omitted.
Figures 3, 4, 5, 6, 7:
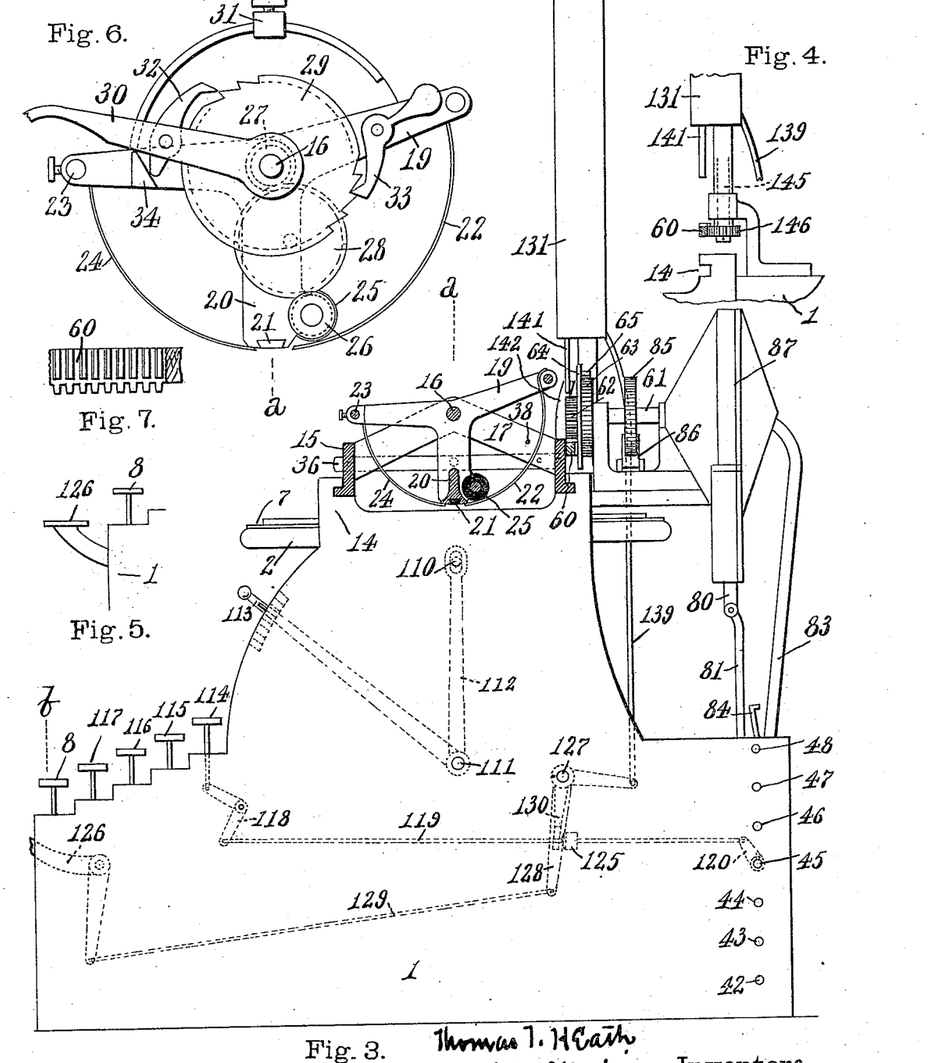
Fig. 3, a side elevation at the left-hand side of the machine, (the left-hand side being at the right in Fig. 1,) the carriage appearing in section in the plane of line $c$, Fig. 1.
Fig. 4, an elevation, from similar point of view, at the foot of the indicator-standard, that part being obscured in Fig. 3 by interfering parts.
Fig. 5, a fragmentary extension at the left of Fig. 3.
Fig. 6, an end view of paper-holder.
Fig. 7, a plan of a portion of the carriage-rack.
Figures 19, 20:
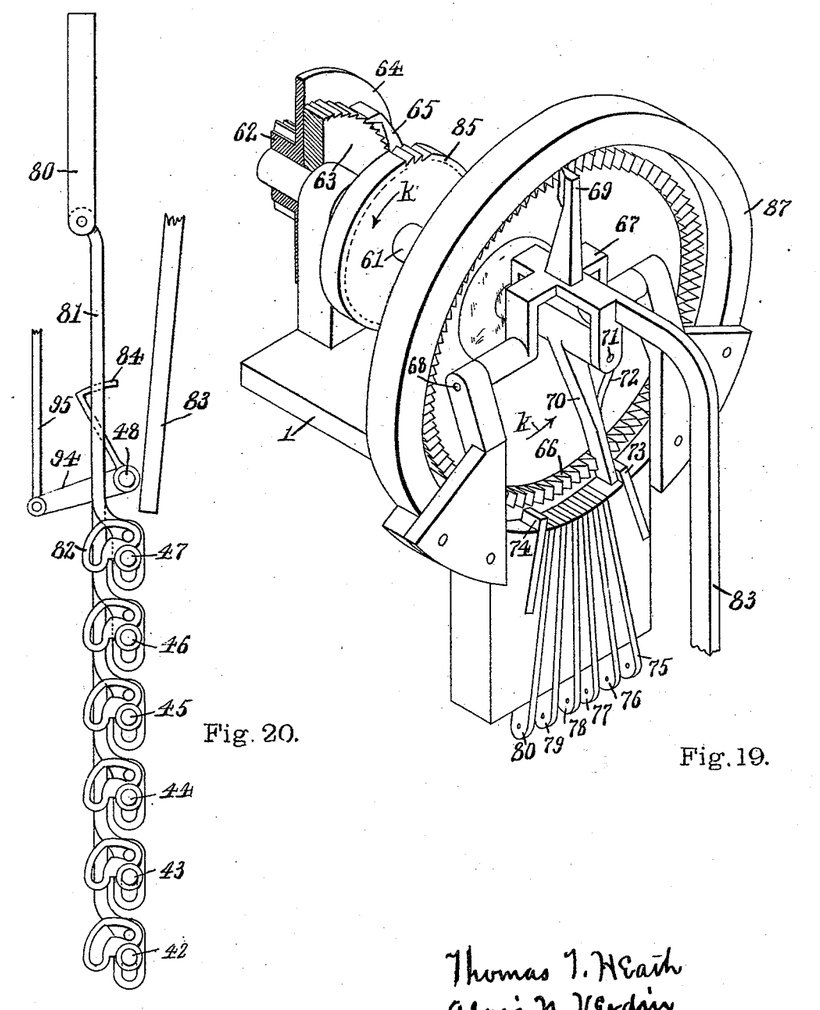
Fig. 19, a perspective view of the feed-measuring mechanism, the case-cover being removed and certain gearing being shown in vertical section in the plane of line $a$ of other figures.
Fig. 20, an end elevation, same direction of view as Fig. 3, of the back shafts and their connections with the feed-measuring device.

Proceeding further with the feed mechanism, and referring particularly to Fig. 19, 60, Figs. 2 and 3, indicates a rack fast upon the carriage; 61, a feed-shaft journaled in the rear upper portion of the machine; 62, a pinion loose on this shaft and engaging the carriage-rack; 63, a ratchet-wheel fast on the feed-shaft near the pinion; 64, a flange fast with pinion 62; 65, a pawl carried by flange 64 and engaging ratchet-wheel 63, the facing direction of the ratchet-teeth being such that, as the ratchet-wheel is fast on the shaft and the shaft assumed as locked, the ratchet-wheel will resist the movement of the carriage in the direction which the spring-barrel urges it, the feed motion of the carriage therefore taking place only when and to such extent as shaft 61 is permitted to turn; 66, a cup-shaped facial ratchet-wheel fast on the rear end of shaft 61, its teeth facing in such direction that a pawl engaging them would resist the advancing rotation of shaft 61 under the influence of the spring-barrel 37, the teeth in this cup-shaped ratchet-wheel being of such pitch that each tooth represents one degree of feed motion for the carriage; 67, a rocker supported by framing at the face of wheel 66; 68, the axis of this rocker horizontally disposed centrally across the face of wheel 66; 69, a finger projecting upwardly from rocker 67 and fixed to the rocker, the finger being therefore adapted to swing into and out of engagement with the teeth of the cup-shaped ratchet-wheel; 70, a second finger carried by rocker 67 and rocking with it upon axis 68, being in this respect rigid with finger 69, the construction being such that fingers 69 and 70 are to be viewed as a rigid double-ended lever rocking together on axis 68 and capable of alternately engaging the teeth of wheel 66, the construction being such that one finger may engage the wheel while the other is disengaged, but that both cannot be disengaged at one time; 71, an axis of oscillation articulating finger 70 to the rocker, and consequently to finger 69, this axis being parallel with the axis of shaft 61, thus permitting finger 70 to have an oscillating motion with reference to finger 69 on axis 71 without interfering with the rigid unification of the two fingers as regards their motion on axis 68; 72, a spring tending to rock finger 70 on its axis 71 and move it in the direction opposite to that which the teeth of wheel 66 moves as the carriage advances; 73, a fixed stop in the path of finger 70, serving, when finger 70 is engaged with the ratchet-wheel, to prevent the advance of the wheel, which, in the absence of stop 73, could take place by the rocking of finger 70 on axis 71; 74, another fixed stop in the path of finger 70, serving to limit the motion of that finger away from stop 73, under the influence of spring 72, when that finger is disengaged from the ratchet-wheel, the distance between the two stops 73 and 74 representing, in angular movement of finger 70, seven teeth of ratchet-wheel 66, and therefore seven degrees of carriage-feed; 75, a sliding stop adapted to move into or out of the path of finger 70, and disposed between the two fixed stops 73 and 74 at such distance from stop 73 that it would, if moved up into arresting position, arrest finger 70 at a distance from stop 73 corresponding with one tooth of the ratchet-wheel or one degree of carriage-feed; 76, 77, 78, 79, and 80, similar sliding stops corresponding, respectively, with two, three, four, five, and six teeth of the ratchet-wheel or degrees of carriage-feed; 81, Fig. 20, links connecting the sliding stops 75, &c., with their appropriate back shafts 42, &c., it being understood that the link from one-degree sliding stop 75 goes to one-degree back shaft 42, and so on, each of these links, at its lower end, being slotted to slide vertically a short distance on its shaft and be guided thereby, it being noted that there is no such link going upward from seven-degree shaft 48, seven-degree stop 74 being a fixed stop; 82, a cam, one for each of the back shafts, except the seven-degree shaft 48, fast on its shaft and engaging a pin on its link 81, so that as a back shaft turns its first effect will be to push up its sliding stop and then hold it up; 83, an arm rigidly attached to rocker 67 and projecting downwardly to the rear of and lying against seven-degree shaft 48; 84, a tappet fast on seven-degree shaft 48 and adapted, as that shaft is rocked, to push outward on arm 83 and rock rocker 67, so as to bring finger 70 out of engagement with the ratchet-wheel 66 and put finger 69 into engagement with the ratchet-wheel, the engagement of finger 69 taking place before finger 70 disengages, the fingers going back to normal position when tappet 84 returns to normal position; 85, a ratchet-wheel fast on feed-shaft 61; 86, Fig. 3, a pawl carried by the frame and engaging this ratchet-wheel, the direction of action being such that feed-shaft 61 may turn only in the direction of advance, and 87 a casing inclosing the rocker and finger-work.

Now, referring to Fig. 19, it is to be understood that the strain of the carriage-spring is tending to turn feed-shaft 61 and the cup-shaped ratchet-wheel in the direction of arrow $k$, and that this turning cannot take place at all by reason of the fact that finger 70 engages the ratchet-wheel and is against stop 73. This is the normal condition of the parts, finger 70 holding the ratchet-wheel against advance. Assume, now, that we operate a type which requires seven degrees of feed. Upon depressing the proper one of finger-keys 8 the type is struck and, at the same time, the seven-degree back shaft 48 is rocked. The rocking of the back shaft causes tappet 84 to move arm 83 and rock the rocker 67. The effect of this movement of the rocker is simply to engage finger 69 with the ratchet-wheel and to release finger 70. Such movement has not permitted any advance of the ratchet-wheel because finger 69 retains the ratchet-wheel as rigidly as did finger 70, but the instant finger 70 moved out of engagement with the ratchet-wheel, then spring 72 caused the finger to fly over against stop 74. All this has taken place during the active movement of the finger-key which effected the type-stroke. Now, the type having struck and the operator's finger having been removed, shaft 48 and other parts tend to assume their normal position. The consequence is that tappet 84 allows rocker 67 to rock, which motion of the rocker first causes finger 70 to engage with the ratchet-wheel, the ratchet-wheel being firmly held against rotation by finger 69, and then to release finger 69 from the ratchet-wheel. When this occurs nothing is to prevent the turning of the ratchet-wheel and it turns, carrying finger 70 with it, until that finger comes in contact with stop 73. This means that ratchet-wheel 66 has advanced seven teeth and that the carriage has been permitted to advance seven degrees of feed. Assume, now, that instead of operating a seven-degree type we operate some type calling for one degree of feed. In the operation of this type back-shaft 42 will be rocked and this movement will push sliding stop 75 up into obstructing position. At the same time, through link-bar 57, Fig. 2, top shaft 48 is moved, causing the movement of the rocker and fingers as before; but in this case finger 70 instead of flying back against fixed stop 74 will become arrested by sliding stop 75, and, when the shafts go back to normal position, ratchet-wheel 66 will advance only the distance from stop 75 to stop 73, equal to one tooth or one degree of carriage movement. In this way the operation of any type effects a permissive advance of the carriage to such number of feed-degrees as is appropriate to the given type.

Pinion 62 being loose on feed-shaft 61 and engaging the shaft only by means of pawl 65, it follows that the carriage may be pushed back by hand, as desired, as at the end of a line, pawl 65 in such case retreating over the teeth of ratchet-wheel 63. Pawl and ratchet 65 and 63 should be of such construction as to pitch, &c., as to correspond with units of feed-travel, as by having the same number of teeth in wheels 63 and 66. Pawl and ratchet 86 and 85 prevent the possibility of feed-shaft 61 turning backward when the carriage is moved back by hand, the motion of shaft 61 being therefore always an advancing one, and the number of teeth in ratchet-wheel 85 should be arranged with reference to the number of teeth in wheel 66.

Means for effecting desired degrees of carriage-feed without the striking of letters, as in spacing between words, will be described later on.

Proceeding now with a description of the mechanism pertaining to the inking-ribbon, and referring particularly to Figs. 15, 16, 17, and 18, 88 indicates two shafts disposed fore and aft in the top of the machine-frame, one near each end of the carriage-guide and loosely journaled in the frame; 89, a ratchet-wheel fast on the rear end of each shaft, the teeth of the two wheels facing oppositely; 90, a horizontal bar engaging the rear ends of the two shafts and slotted so as to be capable of a small amount of endwise motion, the two shafts serving as supports and guides for the bar; 91, a pawl-arm, one for each of the ratchet-wheels, and loosely pivoted on its shaft alongside its ratchet-wheel; 92, a pawl pivoted to this arm and engaging the teeth of the ratchet-wheel; 93, a pin projecting outwardly from the face of the pawl; 94, Figs. 2 and 20, two arms fast upon seven-degree back shaft 48, under the inner end of each of the arms 91; 95, a plunger-rod connected one with each of these arms and projecting up through a guiding-lug in bar 90 and under the end of the appropriate one of levers 91, it being understood, however, that when bar 90 is in its leftward position, as in the drawings, the left-hand plunger-rod 95 will be under the tail of its lever 91, while the right-hand plunger-rod will be out from under the tail of its lever, the result being that each impulse of the seven-degree shaft, which moves with each impulse of the machine, will cause a lifting of the left pawl-arm, 91, the right pawl-arm being unaffected, the effect of such motion being to give advance rotation to the left shaft, 88; 96, a pin in bar 90 to limit the downward motion of pawl-arm 91 and support it when its plunger-rod is shifted out from under its tail end; 97, a finger projecting upwardly from bar 90, one in front of the pin 93 of each pawl 92; 98, a stop-pawl, one for each of the ratchet-wheels 89, pivoted to bar 90 and engaging the ratchet-wheel and preventing retrogression of the wheel as the pawl 92 makes its back motion; 99, a pin projecting from bar 90, one over the tail of each of the stop-pawls, this pin limiting the dropping motion of its stop-pawl, and 100 a cam-shaft journaled in the frame of the machine and serving as a means by which bar 90 may be shifted to its right or left hand position.

Figures 15, 16, 17:
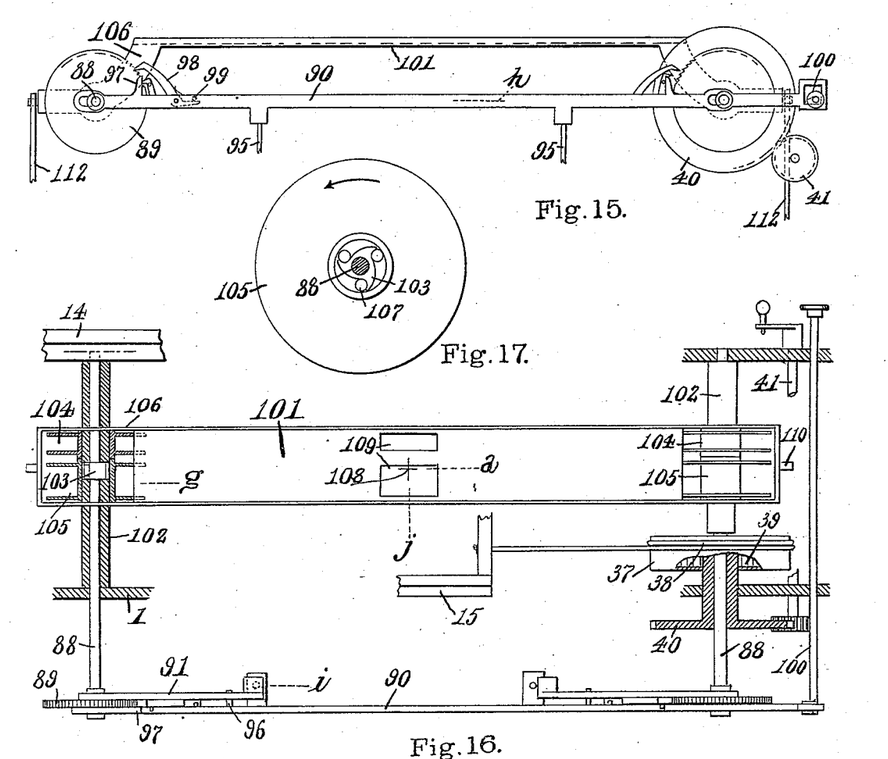
Fig. 15, a rear elevation of the ribbon mechanism.
Fig. 16, a plan of the same with parts in section in the plane of line $h$.
Fig. 17, vertical transverse section, in the plane of line $g$ of one of the ribbon-shafts.
Figure 18:
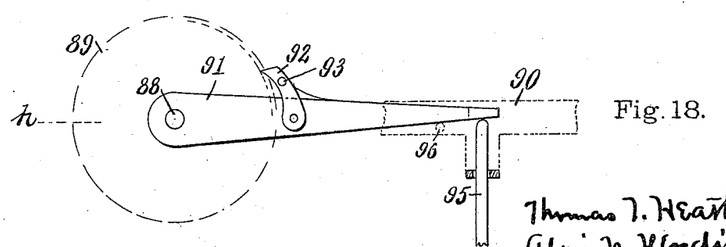
Fig. 18, a rear elevation of one of the ribbon-levers, showing a guide, part in vertical section in the plane of line $i$ of Fig. 16.

The ribbon-spools, to be hereinafter described, are on shafts 88, the ribbon being wound on the spool of one shaft passing along over the striking-point of the type and winding onto the spool on the other shaft. With bar 90 in its left-hand position it is obvious that at each impulse of the machine the left-hand ribbon-shaft will be given a rotative advance, the right-hand shaft being free from the domination of its pawls. When it is desired that the ribbon feed in the other direction, bar 90 is to be shifted to the right. This movement of the bar carries left-hand stop-pawl 98 away from its ratchet-wheel, and left-hand finger 97, engaging pin 93, pulls pawl 92 away from the ratchet-wheel. At the same time the two pawls at the right-hand shaft are allowed to go into action and right-hand plunger-rod 95 is brought under the tail of its pawl-arm, left-hand plunger-rod 95 coming out from under its pawl-arm, whereupon the winding motion will take place at the right-hand shaft and the left-hand mechanism will remain idle.

Proceeding with reference to the same figures of the drawings, 101 indicates a ribbon-table extending at the level of the striking-point of the type along under strip 21 of Fig. 3 and reaching from one of the ribbon-shafts 88 to the other, this table having an upwardly-projecting flange at each of its side edges at sufficient distance apart to permit of two ribbons lying upon the table, the exemplification providing for a wide ribbon and a narrow one, and for purposes of description we will speak of the wide ribbon as the "black" one and the narrow one as the "red" one, the ribbon-table being supported by the two shafts 88 on which it is capable of sliding, so that either ribbon or different points in the width of either ribbon may be brought to the striking-point of the type; 102, sleeves on the ribbon-shafts forming cylindrical enlargements of the same, it being on these enlargements that the ribbon-table slides, these sleeves, of which there are two on each ribbon-shaft, not covering the entire length of their shaft, a vacancy being left where the two sleeves of a shaft approach; 103, a cam formed on or secured to each ribbon-shaft between the inner ends of its sleeves, the exterior diameter of the cam not exceeding the diameter of the sleeves, and the cam being formed with one or more volute or eccentric surfaces, as indicated in Fig. 17; 104, the narrow spools for the red ribbon, one on each ribbon-shaft, these spools fitting loosely on the sleeves 102; 105, similar spools, but wider, for the black ribbon, disposed alongside the narrow spools, the two spools of a pair at one shaft thus filling the space between the sides of the ribbon-table and sliding on the sleeves as the ribbon-table is moved backward or forward; 106, arms projecting downwardly from the ribbon-table outside the ribbon-spools and serving as the means by which the ribbon-shafts support the ribbon-table and by which the shifting movement of the ribbon-table slides the spools along the ribbon-shafts; 107, Fig. 17, a small roll held by cam 103, one roll for each lobe of each cam, this roll being confined in the cam-space by the encircling hub of the spool, either the wide spool or narrow spool, whichever may be over the cam-space, the size of the roll being such that normally they are free; but if the ribbon-shaft and cam be turned in the feeding direction pertinent to that shaft the roll will ride up on the cam and impinge against the bore of the ribbon-spool and force the spool to turn with the shaft; 108, the striking-point of the type, being the intersection of vertical planes $a$ and $j$; 109, two openings in the ribbon-table, at the center of its length, so as to expose the width of the ribbons in the fore-and-aft plane $j$ of the striking-point; 110, a trunnion at each end of the structure of the ribbon-table; 111, Fig. 3, a shaft disposed across the machine under the striking-point of the type; 112, arms at each side of the machine, fast on this shaft, their upper ends engaging the trunnions 110, and 113 a detent-handle for rocking these arms.

A black ribbon being on the wide spools and a red ribbon being on the narrower ones, either ribbon may be brought into action over the striking-point of the type by shifting handle 113, which moves the table and spools fore and aft, as desired, the same movement being also utilized in adjusting either ribbon widthwise over the striking-point. With the parts in the position shown in Fig. 16, the black ribbon will be over the striking-point. Each impulse of the machine gives feeding motion to the ribbon-shafts, and provision is made that only the ribbon in present use shall be fed; otherwise one ribbon might be completely unwound before the other is ready for reversal. In the present case the ribbon-shafts drive the spools, in winding up the ribbon, through the medium of cam 103 and roll 107. It will be observed in Fig. 16 that only the black spool is engaged by these parts. Consequently the feed motion of the ribbon-shafts will be transmitted only to the black ribbon, the red spools remaining stationary. If the ribbon table and spools be shifted rearwardly to bring the red ribbon into action, the red spools will encircle the cams and be driven by the spool-shafts while the black spools remain stationary. This plan permits also of the independent turning of the spools by hand, regardless of their shafts, by simply shifting the table structure so that the desired spools are free of the cams. This feature is of utility in applying new ribbons. It is to be understood that each of the ribbon-shafts 88 has a cam 103, arranged, of course, to operate in the appropriate direction.

Attention will now be given to the space-feeding system, it having been explained that there are seven degrees of feed available and under the control of the back shafts. It should be here stated that in the exemplification four degrees of feed have been chosen as appropriate for the spacing between words.

Figures 9, 10:
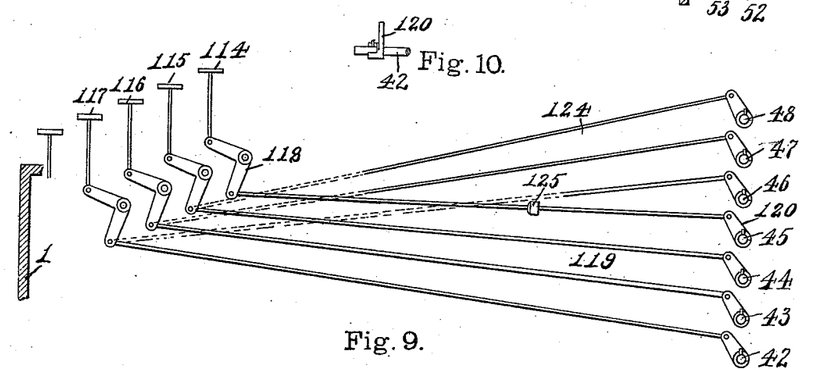
Fig. 9, a side elevation, from same point of view, of the spacing-keys and connections, a portion of the frame appearing in section in the plane of line $e$ of other figures.
Fig. 10, a rear elevation of one of the arms, showing at the right of Fig. 9.

Proceeding with the drawings, and referring to Figs. 1, 2, 3, and 9, 114, 115, 116, and 117 indicate four finger-keys at the end of the keyboard and appropriated, respectively, to four, three, two and one degrees of carriage-feed; 118, Fig. 9, a bell-crank pivoted to the frame at the foot of each of these keys and connected with the stems of the keys; 119, links extending rearwardly from these bell-cranks, one link for each crank; 120, Figs. 2 and 9, an arm on each of the back shafts 42, &c., those on the lower four shafts being engaged appropriately by the links 119, so that one-degree finger-key 117 will rock the arm on one-degree back shaft 42, these arms having a fly attachment with their shafts, as shown in Fig. 10, so that rearward movement of an arm will rock its shaft, but the rocking of the shaft by other means, as by means of a type-key, will not rock the arm, this fly connection being a mere expedient to prevent the operation of the spacing keys and links when type-keys are operated; 121, 122, and 123, Fig. 1, three additional finger-keys at the other end of the keyboard, appropriated, respectively, to seven, six, and five degrees of carriage-feed, these keys being also connected with bell-cranks like 118 at their side of the machine; and 124, Fig. 9, links connecting the bell-cranks of these last-mentioned finger-keys with their appropriate back shafts.

If spacing-key 117 be operated, it will rock one-degree shaft 42, and the carriage will take one degree of feed precisely as though that shaft had been rocked in the operation of a type calling for one degree of feed. Similarly, any one of the seven degrees of feed may be given to the carriage, without the striking of type, by operating an appropriate spacing-key. In this way spacing may be effected between words, or the carriage may be advanced idly for any purpose.

Proceeding with the drawings, referring to the same figures, 125, Figs. 9 and 3, indicates a collar fast on the link 119 pertaining to the four-degree spacing-key 114; 126, Fig. 3, a spacing-key pivoted in the central front of the machine and readily accessible to the operator's hand in working the keyboard; 127, the cross-shaft journaled in the frame of the machine; 128, an arm fast on this shaft; 129, a link connecting this arm with spacing-key 126, which key will be hereinafter designated as the "word-spacer;" 130, an arm fast on shaft 127 and resting its lower end against the face of collar 125, the arrangement being obviously such that four-degree back shaft 45 may be rocked and four degrees of feed given either by the four-degree finger-key 114 or the word-spacer 126; 131, an indicating-dial supported over the machine; 132, Fig. 1, a circle of graduations on this dial, hereinafter designated as the "space-counter," the exemplification providing for thirty counts, that being sufficient to comprehend the greatest number of spaces liable to occur in ordinary lines of work; 133, a pointer arranged to operate in connection with the space-counter; 134, Fig. 2, a ratchet-wheel on the spindle of this pointer; 135, a spring within this wheel tending to carry the pointer to its zero; 136, a pawl-arm pivoted at the axis of this ratchet-wheel; 137, a pawl carried by this pawl-arm and adapted to engage the ratchet-wheel and move pointer 133; 138, a fixed pawl-stop engaged by the tail of the pawl 137 when the pawl-arm 136 is in normal position, thus holding the pawl out of engagement with its ratchet-wheel; 139, Figs. 2 and 3, a link extending from pawl-arm 136 down to an arm fast on shaft 127, whereby the rocking of shaft 127, when word-spacer 126 is operated, will lift pawl-arm 136 and advance its ratchet-wheel one tooth and its pointer one count on the space-counter; 140, a stop-pawl pivoted on a fixed pivot and engaging the ratchet-wheel 134 and preventing its retrogression; 141, a tail projecting downwardly from this pawl; and 142, a tappet projecting upwardly from the carriage-rack 60 and adapted, when the carriage is moved back in position for the beginning of a line, to strike pawl-tail 141 and release stop-pawl 140 from its ratchet-wheel.

By inspecting Fig. 3 it will be observed that if four-degree space-key 114 be operated, four-degree shaft 45 will be rocked, but no motion will be given to shaft 127 or to any of the space-counting mechanism, but that if word-spacer 126 be operated shaft 127 will be rocked and pointer 133 will advance one degree of count. Therefore space-counter 132 keeps track of the number of times word-spacer 126 has been operated to give four degrees of carriage-feed, but takes no notice of four-degree feeding motions installed by four-degree finger-key 114, notwithstanding the fact that both actions were through back shaft 45. At or near the end of the line the operator may therefore know from space-counter 132 how many spaces have been employed in the line. When the carriage is run back for the beginning of a new line, tappet 142 throws stop-pawl 140 out of action and spring 135 returns pointer 133 to its zero, pawl 137 being normally out of engagement with its ratchet-wheel, so as not to interfere with this procedure.

As to keeping count of the total number of feed-units which have been put into a line, referring to Figs. 1, 2, 3, 4, and 7 of the drawings, 143 indicates a circle of one hundred graduations on the dial of the indicator, coarse and easily read, each graduation representing one degree of carriage advance; 144, a pointer for this circle of graduations; 145, Figs. 2 and 4, a shaft extending upwardly from near the carriage-rack 60 to the axis of pointer 144; 146, a pinion fast on this shaft and engaging the carriage-rack, the carriage-rack having teeth on its side for this pinion as well as on its upper face for feed-pinion 62, as seen in Figs. 3 and 7; 147, bevel-gearing connecting shaft 145 with pointer 144; 148, a circle of graduations to indicate the number of complete rounds made by pointer 144, pointer 144 thus indicating units of carriage-feed while hundreds of units are to be read from circle 148; 149, a pointer for the graduated circle 148; 150, a star-wheel on the axle of pointer 149, with a tooth for each graduation of circle 148; 151, a finger fast on the axle of pointer 144 and adapted at each passage to turn star-wheel 150 one tooth, and 152 a stop-pawl to detain the star-wheel in any position in which the finger has put it.

Each degree of carriage advance may be read on circle 143, hundreds of degrees being read on circle 148. When the carriage is moved back to start a new line, pointer 144 also goes back, and in the course of its turns resets pointer 149 to zero, all the three pointers of the indicator therefore standing at zero when the carriage is in the position for the beginning of a line.

Assume a chosen line length corresponding with one hundred and twenty units of carriage-feed to be occupied by words and spaces, a word or syllable to come out even at the end of a line. The operator proceeds to write, using word-spacer 126 between words. Pointers 144 and 149 will indicate at all times during the progress of the work the number of units which have been absorbed, each letter advancing the count in accordance with its degree of feed requirement and each stroke of word-spacer 126 advancing the count four degrees. At the end of a word near the established limit, which is one hundred and twenty units, the operator discovers that one hundred and fifteen units have been absorbed, and he at once determines that a normal space and the following word cannot be gotten into the remaining five units of line length. This means that the line is five units short of being filled. Pointer 133 shows him, say, that five spaces have been employed in the line. It is therefore evident that one unit added to each space would just complete the line. If, with this knowledge, the line were to be written over and the five-degree spacing-key 123 were employed for the spacing instead of word-spacer 126, the line would come out even. Therefore, the operator, having written such defective line and gotten the data, may write after the line a memorandum to guide in future copying. Such memorandum may consist of the figure 5 with an asterisk after it, (5*,) which symbol is to be understood as indicating that all of the spaces are to be made with the five-degree space-key instead of with the word-spacer. In the case just given the number of units of shortage exactly equal the number of spaces, and therefore it was a simple question of adding a unit to each space. Suppose, however, that the unit-count stood at one hundred and seventeen instead of one hundred and twenty, thus indicating a shortage of but three units. In such case the memorandum at the end of the line should state that three of the spaces were to be of five degrees, the balance being normal. The symbol then written at the end of the line might well be a figure 3, followed by a hyphen and then by a figure 5, (3-5,) the symbol indicating that three of the spaces are to be of five degrees, the balance normal. In a similar manner the memorandum at the end of lines may indicate respacing suited to any conditions. The shortage as compared with the number of spaces may be such that it is proper to make a certain number of the spaces normal, and some five degrees and some six, in which case the memorandums will indicate such fact by showing the number of spaces to receive each degree of treatment. The operator can at a glance determine the best system of spacing and will call for variations in the spacing between words only when uniform spacing will not accomplish the desired purpose, or when the length of words may render a variety of spacing preferable to a uniform one in excess of the normal, precisely as the printer spaces out his lines of type.

Having produced such copy with proper memorandums at the end of lines which do not naturally come out right, the matter may be rewritten on this machine and perfectly-justified copy will be produced, or the copy with its line memorandums is at once ready for the operator of a type-setting or matrix-making machine arranged upon the same scale of units for the font of type, in which case the operation of the type-setting machine or matrix-making machine will involve, as a line is produced, the employment of such degree of spacing as the memorandum on the copy calls for, justified work being the result.

By "variable-spacing mechanism for use between words" in the claims is meant the spacing-key devices for varying the spaces between words, as distinguished from the variable letter or type feed mechanism.

We claim as our invention—

1. The combination, substantially as set forth, with a type-writing machine having both a uniform and a variable spacing mechanism for use between words, and graduations to indicate the stage of carriage advance, of an indicator operated from said uniform-spacing mechanism to show the number of times said uniform-spacing mechanism has been operated in one line of writing.

2. The combination, substantially as set forth, with a type-writing machine having a uniform-spacing mechanism for use between words, and graduations to indicate the stage of carriage advance, of an indicator operated from said spacing mechanism to show the number of times it has been operated in one line of writing, and mechanism operated by the machine for returning said indicator to its zero when the carriage is returned for the beginning of a new line of writing.

3. The improvement in the art of justifying copy, which consists in employing uniform-feed spacing for use between the words, advancing the carriage with each character or space used, registering the units of carriage advance, and separately registering the units of uniform-word-space feed in each line, and finally employing a variable-feed space for use between words in justifying the lines from such registration.

4. The combination, substantially as set forth, with a type-writing machine having both a uniform and a variable-spacing mechanism for use between words, of an indicator operated from the carriage of the machine and arranged to show the stage of carriage advance on a multiplied scale, and an indicator operated from said uniform-spacing mechanism to show the number of times it has been operated in one line of writing.

5. The combination, substantially as set forth, with a type-writing machine, of an indicator operated from the carriage of the machine and arranged to show the stage of carriage advance on a multiplied scale and return to its zero when the carriage is returned for the beginning of a new line of writing, both a uniform and a variable spacing mechanism for use between words, and an indicator operated from said uniform-spacing mechanism to show the number of times it has been operated in one line of writing.

6. The combination, substantially as set forth, with a type-writing machine, of an indicator operated from the carriage of the machine and arranged to show the stage of carriage advance on a multiplied scale, both a uniform and a variable spacing mechanism for use between words, an indicator operated from said uniform-spacing mechanism to show the number of times it has been operated in one line of writing and mechanism operated by the machine for returning said last-mentioned indicator to its zero when the carriage is returned for the beginning of a new line of writing.

7. The combination, substantially as set forth, with a type-writing machine, of an indicator operated from the carriage of the machine and arranged to show the stage of carriage advance on a multiplied scale and return to its zero when the carriage is returned for the beginning of a new line of writing, both a uniform and a variable spacing mechanism for use between words, an indicator operated from said uniform-spacing mechanism to show the number of times it has been operated in one line of writing, and mechanism operated by the machine for returning said last-mentioned indicator to its zero when the carriage is returned for the beginning of a new line of writing.

8. The combination, substantially as set forth, with a type-writing machine, of a uniform and several variable space feed installing devices for use between words having different feed values, and an indicator operated from one of said devices to show the number of times it has been operated in one line of writing.

9. The combination, substantially as set forth, with a type-writing machine, of a uniform and several variable space feed installing devices for use between words having different feed values, an indicator operated from one of said devices to show the number of times it has been operated in one line of writing, and mechanism for returning said indicator to its zero when the carriage is returned for the beginning of a new line of writing.

10. The combination, substantially as set forth, with a type-writing machine, of a uniform and several variable space feed installing devices for use between words having different feed values, and an indicator operated from the carriage of the machine and arranged to show the stage of carriage advance on a multiplied scale and mechanism operated by the machine for returning the indicator to zero when the carriage is returned for the beginning of a new line of writing.

11. The combination, substantially as set forth, with a type-writing machine, of several feed-installing devices operated appropriately with the several types of the machine, graduations to indicate the stage of carriage advance, both a uniform and a variable spacing mechanism for use between words, and an indicator operated from said uniform-spacing mechanism to show the number of times it has been operated in one line of writing.

12. The combination, substantially as set forth, with a type-writing machine, of several variable-feed-installing devices for both letters and spaces operated appropriately with the several types of the machine, graduations to indicate the stage of carriage advance, a uniform-spacing mechanism for use between words, an indicator operated from said spacing mechanism to show the number of times it has been operated in one line of writing, and mechanism operated by the machine for returning said indicator to its zero when the carriage is returned for the beginning of a new line of writing.

13. The combination, substantially as set forth, with a type-writing machine, of several feed-installing devices operated appropriately with the several types of the machine, both a uniform and a variable spacing mechanism for use between words, and an indicator operated from the carriage of the machine and arranged to show the stage of carriage advance on a multiplied scale and mechanism operated by the machine for returning the indicator to zero when the carriage is returned for the beginning of a new line of writing.

14. The combination with a type-writing machine, of several letter-feed-installing devices having different values, a variable-spacing mechanism for use between words, a key for operating each of said devices or mechanisms independently, an additional uniform-feed-space key for use between words, and an indicator operated from said last-mentioned key to show the number of times it has been operated in one line of writing.

15. The combination with a type-writing machine, of several variable letter-feed devices having different values, a variable-spacing mechanism for use between words, a key for operating each of said devices or mechanisms independently, an indicator, an additional uniform-feed-space key for use between words, connections from one only of said feed mechanisms or devices to the uniform-space key, and connections from said last-mentioned key to said indicator.

16. The combination, substantially as set forth, with a type-writing machine, of a ribbon-spool at each end of the desired ribbon stretch, a perforated ribbon-table extending under the ribbon from spool to spool and engaging the ends of the spools, a shaft below and parallel with the ribbon-table, and arms fast on said shaft and engaging the ends of the ribbon-table.

17. The combination, substantially as set forth, with a type-writing machine, of a shaft at each end of the desired ribbon stretch, two ribbon-spools on each shaft, and a perforated ribbon-table extending from shaft to shaft and provided at each end with a pair of arms fitted to slide on the shafts and embracing the two spools between them.

18. The combination, substantially as set forth, with a type-writing machine, of a ribbon-shaft, a ratchet-wheel thereon, a pawl-carrying lever for turning the wheel and shaft, a reciprocating plunger-rod engaging under the free end of the lever, and a shifting-guide for the plunger-rod to maintain it under or from under the lever.

19. The combination, substantially as set forth, with a type-writing machine, of two ribbon-shafts, a ratchet-wheel on each, a pawl-carrying lever for each wheel, a shifting-bar extending from shaft to shaft, a stop-pawl for each wheel pivoted on and carried by said bar, and a finger on the bar at each first-mentioned pawl to hold the pawl out of action when desired.

20. The combination, substantially as set forth, in a type-writing machine, of an annular ring radially slotted upwardly from its lower face and having a downwardly-projecting inner annular lip, and type-bars fitting said slots and having their heels pivoted in the outer extremities thereof.

21. The combination, substantially as set forth, in a type-writing machine, of a ring having a lower portion of greater diameter than the upper portion and having radial slots in the same, and type-bars with their heels pivoted in the slotted enlarged lower portion of the ring.

22. The combination, substantially as set forth, in a type-writing machine, of a ring having a lower portion of greater diameter than the upper portion and having radial slots in the same, type-bars with their heels pivoted in the slotted enlarged lower portion of the ring, and a notched keeper-ring secured on said first-mentioned ring over said circular groove.

23. The combination, substantially as set forth, in a type-writer, of a carriage, a feed-roll therein at the paper-entering side of the type-striking point of the machine, a rigid bar parallel with the feed-roll and over said striking-point, a fender curving rearwardly up from under said feed-roll, and held at its upper edge, and clips curving forwardly up from the front lower face of said bar and held at their upper ends.

24. The combination, substantially as set forth, in a type-writing machine, of a carriage, rocking spiders connected with the carriage by a pivot-axis in fixed position and parallel with the path of carriage travel, an anvil-bar rigidly supported by the spiders over the type-striking point, a feed-roll journaled in the spiders to the rear of said bar, a fender and clips supported by the spiders, and a detent to hold the spiders in normal position in the carriage.

25. The combination, substantially as set forth, in a type-writing machine, of a carriage, a shaft loose therein over the type-striking point and parallel with path of carriage travel, a handle on the shaft, spiders on the shaft, an anvil-bar rigidly supported by the spiders, a feed-roll journaled in the spiders, a train of gears connecting the shaft and feed-roll, and a detent to hold the spiders in normal position in the carriage.

26. The combination, substantially as set forth, in a type-writing machine, of a carriage, a shaft loose therein over the type-striking point and parallel with path of carriage travel, a handle on the shaft, spiders on the shaft, an anvil-bar rigidly supported by the spiders, a feed-roll journaled in the spiders, a train of gears connecting the shaft and feed-roll, a detent to hold the spiders in normal position in the carriage, a ratchet-wheel fast on the shaft, a finger-lever pivoted loosely on the shaft, and a pawl carried by the lever and engaging the ratchet-wheel.

27. The combination, substantially as set forth, in a type-writing machine, of a feed-roll for moving the paper in the carriage, a ratchet-wheel controlling the motion of the feed-roll, a stop-pawl for normally checking the ratchet-wheel, a finger-lever, a second pawl carried thereby and adapted to advance the ratchet-wheel, and a pawl-stop normally engaged by the last-mentioned pawl and holding the pawl normally out of engagement with the ratchet-wheel.

28. The combination, substantially as set forth, of a rotary feed-shaft, a ratchet-wheel mounted upon the feed-shaft and rigid therewith, an agent, as a spring, tending to advance the series of teeth, a first finger adapted to move into and out of engagement with the teeth but incapable of movement in the path of tooth travel, a second finger normally engaging the teeth and capable of moving into and out of engagement with the teeth and of moving in the path of tooth travel, a union between said fingers to cause one to engage the teeth if the other disengages, said fingers and union being disposed across the face of the ratchet-wheel, a spring urging the second finger backward, two stops to limit the motions of the second finger in the path of tooth travel, and a trip to disengage the second finger from the teeth when desired.

29. The combination, substantially as set forth, of a rotary feed-shaft, a ratchet-wheel mounted upon the feed-shaft and rigid therewith, an agent, as a spring, tending to advance the series of teeth, a first finger adapted to move into and out of engagement with the teeth but incapable of movement in the path of tooth travel, a second finger normally engaging the teeth and capable of moving into and out of engagement with the teeth and of moving in the path of tooth travel, a union between said fingers to cause one to engage the teeth if the other disengages, said fingers and union being disposed across the face of the ratchet-wheel, a spring urging the second finger backward, two stops to limit the motions of the second finger in the path of tooth travel, a trip to disengage the second finger from the teeth when desired, and one or more movable stops intermediate between the mentioned stops and adapted, when moved to obstructing position, to limit the backward motion of the second finger in the path of tooth travel.

30. The combination, substantially as set forth, of a rotary feed-shaft, of a facial ratchet-wheel mounted upon the feed-shaft and rigid therewith, an agent, as a spring, tending to turn the wheel forward, a first finger adapted for motion only into and out of engagement with the teeth of the wheel, a second finger rocking with the first one but capable also of motion in the path of the wheel-teeth, a spring urging the second finger backward, stops to limit the motion of the second finger in the path of the teeth, and means for rocking the two fingers to alternatively disengage either of them from the wheel-teeth, said fingers being disposed across the face of the ratchet-wheel.

31. The combination, substantially as set forth, in a type-writing machine, of a feed-shaft, feed-installing mechanism locking the shaft except at feeding instants when it is permitted to turn, a feed-pinion loose on the shaft and urged by the carriage to advance on the shaft, a pawl and ratchet uniting the pinion to the shaft and permitting the pinion to advance only with the shaft, a ratchet-wheel fast on the shaft, and a pawl mounted on a fixed pivot and engaging the last-mentioned ratchet-wheel and permitting advancing motion only to the shaft.

32. The combination in a type-writer, of a uniform and a variable spacing mechanism for use between words, a variable-letter-feed mechanism for types of different values, and an indicator to show the number of times, respectively, the uniform-spacing mechanism and the letter-feed mechanism have been operated.

33. The combination, substantially as set forth, in a type-writing machine, of type-shafts arranged fore and aft in vertical rows those of a row pertaining to types of equal feed-measure, feed-installing shafts arranged in a vertical row across the machine to the rear of the type-shafts, arms on each type-shaft and feed-shaft, connections between the arms of each vertical row of type-shafts and the arm of a feed-shaft pertaining to the feed measure of the row of type-shafts, and connections appropriately from the feed-shafts to the feed-measuring device of the machine.

34. The combination, substantially as set forth, in a type-writing machine, of type-shafts arranged fore and aft in vertical rows those of a row pertaining to types of equal feed-measure, feed-installing shafts arranged in a vertical row across the machine to the rear of the type-shafts, arms on each type-shaft and feed-shaft, connections between the arms of each vertical row of type-shafts and the arm of a feed-shaft pertaining to the feed measure of the row of type-shafts, connections appropriately from the feed-shafts to the feed-measuring device of the machine, a spacing-key for each degree of feed measure, and connections appropriately from said spacing-keys to the feed-shafts.

35. The combination, substantially as set forth, in a type-writing machine, of type-shafts arranged fore and aft in vertical rows those of a row pertaining to types of equal feed-measure, feed-installing shafts arranged in a vertical row across the machine to the rear of the type-shafts, arms on each type-shaft and feed-shaft, connections between the arms of each vertical row of type-shafts and the arm of a feed-shaft pertaining to the feed measure of the row of type-shafts, connections appropriately from the feed-shafts to the feed-measuring device of the machine, a spacing-key for each degree of feed measure, connections appropriately from said spacing-keys to the feed-shafts, an additional spacing-key for one of the degrees of feed measure and separated from them on the keyboard, and connections from such additional spacing-key to a selected one of the feed-shafts.

36. The combination of a ring with radial slots for the heels or shafts of type-bars, having a circular groove communicating with said slots, closed at the bottom and extending upwardly, and a keeper-piece mounted above the groove.

37. The improvement in the art of printing which consists in employing a variable-letter feed and a uniform-space feed for use between words, registering the units of carriage advance and separately registering the units of uniform-word-space feed of each line, and finally employing a variable-space feed for use between words in justifying the lines from such registration.

THOMAS T. HEATH.
ALOIS N. VERDIN.

Witnesses:
PHILIP RENNER,
CHAS. M. MILLER.